(12) United States Patent
Hoang et al.

(10) Patent No.: US 10,977,304 B2
(45) Date of Patent: Apr. 13, 2021

(54) METHODS AND SYSTEM FOR ESTIMATING JOB AND CAREER TRANSITION CAPABILITIES OF CANDIDATES IN A DATABASE

(71) Applicant: CareerBuilder, LLC, Chicago, IL (US)

(72) Inventors: Phuong Hoang, Norcross, GA (US); Yun Zhu, Norcross, GA (US); Faizan Javed, Norcross, GA (US)

(73) Assignee: CareerBuilder, LLC, Chicago, IL (US)

( * ) Notice: Subject to any disclaimer, the term of this patent is extended or adjusted under 35 U.S.C. 154(b) by 915 days.

(21) Appl. No.: 15/667,418

(22) Filed: Aug. 2, 2017

(65) Prior Publication Data
US 2019/0042646 A1 Feb. 7, 2019

(51) Int. Cl.
*G06F 16/00* (2019.01)
*G06F 16/635* (2019.01)
*G06Q 10/10* (2012.01)
*G06F 17/18* (2006.01)
*G06Q 30/02* (2012.01)

(52) U.S. Cl.
CPC .......... *G06F 16/635* (2019.01); *G06F 17/18* (2013.01); *G06Q 10/1053* (2013.01); *G06Q 30/0201* (2013.01)

(58) Field of Classification Search
CPC ... G06F 16/635; G06F 17/18; G06Q 10/1053; G06Q 30/0201

USPC ........................................................ 707/749
See application file for complete search history.

(56) References Cited

U.S. PATENT DOCUMENTS

| | | | |
|---|---|---|---|
| 2008/0027770 A1* | 1/2008 | Tigali | G06Q 10/06311 705/7.13 |
| 2011/0015958 A1* | 1/2011 | April | G06Q 10/06 705/321 |
| 2013/0166358 A1* | 6/2013 | Parmar | G06Q 10/06393 705/7.39 |
| 2014/0317079 A1* | 10/2014 | Obernikhin | G06F 16/2468 707/706 |

* cited by examiner

*Primary Examiner* — Vincent F Boccio
(74) *Attorney, Agent, or Firm* — Neal, Gerber & Eisenberg LLP

(57) ABSTRACT

Method and apparatus are disclosed for estimating job and career transition capabilities of candidates in a database. An example system for processing a search query indicative of a candidate to hire includes a database including records of a plurality of profiles, a network connector to provide access to the database via an application programming interface, and a computing device. The computing device periodically generates a first score representing a likelihood that a person associated with the respective profile will respond to a communication regarding a job in a particular category. The computing device also, in response to receiving a search query (a) generates a second score representing a probabilistic measurement of a likelihood that the person associated with the retrieved profile will change jobs, (b) generates a third score representative of a percentile level of activity associated with searching for a new job.

14 Claims, 7 Drawing Sheets

METHODS AND SYSTEM FOR ESTIMATING JOB AND CAREER TRANSITION CAPABILITIES OF CANDIDATES IN A DATABASE

TECHNICAL FIELD

The present disclosure generally relates to database management systems and, more specifically, methods and systems for estimating job and career transition capabilities of candidates in a database.

BACKGROUND

Typically, employment websites (e.g., CareerBuilder.com®) are utilized by employers and users interested in the job market (such as job seekers). Oftentimes, an employment website incorporates a job board on which employers may post positions they are seeking to fill. In some instances, the job board enables an employer to include duties of a position and/or desired or required qualifications of job seekers for the position. Additionally, the employment website may enable a job seeker to search through positions posted on the job board. If the user identifies a position of interest, the employment website may provide an application to the user for the user to fill out and submit to the employer via the employment website.

When looking to fill a position, the employers search through resumes to find candidates. Sometimes, the employers also search profiles of the users, even when the users have not submitted an application. Once employed and/or not seeking employment, the users may actively or passively maintain their profiles on the employment website. Thus, their profile is accessible to the employers looking to fill positions. Employers may spend time searching and sorting through profiles to find potential job candidates, even though some of those candidates are not interested or looking for a job. As such, employers inefficiently spend time searching through the profile database to find profiles with skills that meet the employer's need and are interested in a new opportunity. As a result, there is a need for an employer to identify profiles in a profile database of candidates that are actively looking for new opportunities. These profiles have a high propensity to leave their current employment and hence are more likely to respond to a communication regarding an opportunity.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for estimating job and career transition capabilities of candidates in a database. An example system for processing a search query indicative of a candidate to hire includes a database including records of a plurality of profiles, a network connector to provide access to the database via an application programming interface, and a computing device. The computing device periodically generates a first score according to a pre-set time schedule for each of a plurality of categories for the plurality of profiles in the database. Each of the first scores represents a likelihood that a person associated with the respective profile will respond to a communication regarding a job in a respective one of the plurality of categories. The computing device also, in response to receiving a search query via the network connector, (a) establishes a connection to the database, (b) retrieves one of the plurality of profiles responsive to the search query from the database, (c) generates, on demand, a second score based on characteristic data and activity data in the retrieved profile, the second score being a probabilistic measurement of a likelihood that the person associated with the retrieved profile will change jobs, (d) generates, on demand, a third score based on the activity data in the retrieved profile, the third score is representative of a percentile level of activity associated with searching for a new job, and (e) presents, via the network connector, a portion of the profile with the first score, the second score, and the third score. Additionally, in response to receiving a request, via the application programming interface, to track the profile associated with the search query, the computing device (i) periodically automatically regenerates the second score based on the characteristic data and the activity data in the profile and the third score based on the activity data in the retrieved profile, and (ii) when the second score satisfies the threshold, sends an alert to an originator of the search query. The request includes the threshold.

An example method to process a search query indicative of a candidate to hire includes automatically generating, via a server connected to a database, a first score according to a pre-set time schedule for each of a plurality of categories for profiles in the database. Each of the first scores represents a likelihood that a person associated with the respective profile will respond to a communication regarding an opportunity in a respective one of the plurality of categories. The method also includes, in response to receiving the search query via an application programming interface (a) establishing a connection to the database (b) retrieving one of the profiles responsive to the search query from the database, (c) generating a second score based on characteristic data and activity data in the retrieved profile, (d) generating a third score based on the activity data in the retrieved profile, and (e) presenting, via the application programming interface, a portion of the profile with the first score, the second score, and the third score. The second score is a probabilistic measurement of a likelihood that the person associated with the retrieved profile will change jobs. The third score represents a percentile level of activity associated with searching for a new job. Additionally, the method includes in response to receiving a request, via the application programming interface, to track the profile associated with the search query, (i) periodically automatically regenerating the second score based on the characteristic data and the activity data in the profile and the third score based on the activity data in the retrieved profile, and (ii) when the second score satisfies the threshold, sending an alert to an originator of the search query. The request includes a threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
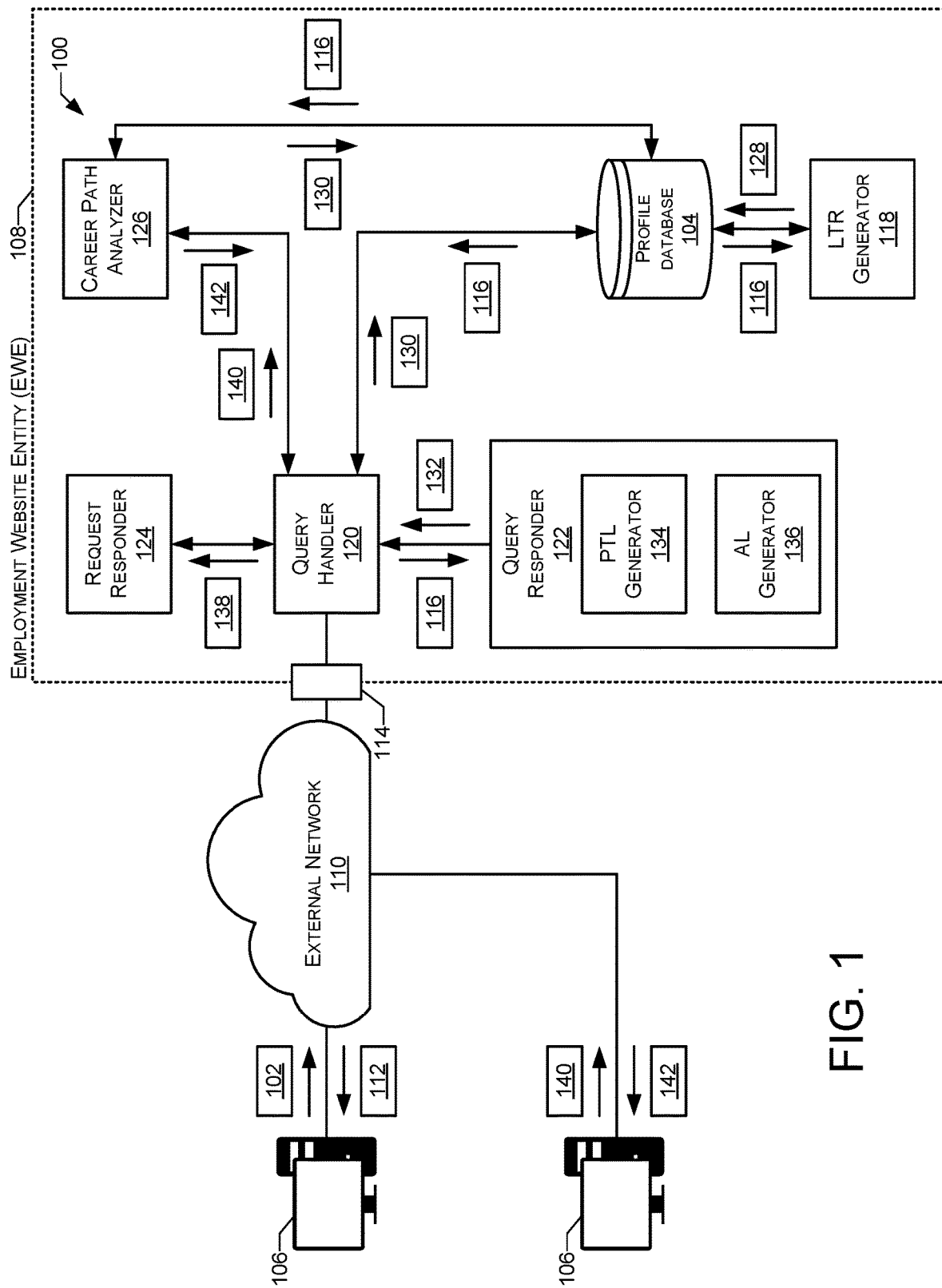
FIG. 1 illustrates a system to receive queries regarding candidates in a profile database and estimate job and career transition capabilities of candidates in the profile database in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As used herein, "on demand" refers to taking action in response to a request without further interaction with the requester. As used herein, "real time" refers to a time period that is simultaneous to and/or immediately after an employer submits a search query As used herein, a user may be an individual who registers with an employment website to use the website as a job-seeker, while an employer/recruiter may be an individual that uses the employment website to find candidates for opportunities for employment. A job or an opportunity may include positions in which a worker is paid (e.g., an employee, etc.) and positions in which a worker is unpaid (e.g., a volunteer, an intern, etc.).

When users of an employment website sign up, they provide details of past and current employment (e.g., employers, job titles, location, starting and ending dates, etc.), education (e.g., schools, starting and ending dates, grade point averages, class rankings, etc.), and/or skills. Skills may include technical skills and subjective skills. For example, technical skills may include knowledge of certain software (e.g., AutoCAD®, Excel®, Photoshop®, etc.), computer programming languages (e.g., Python, C#, Java, etc.), and certifications (e.g., Certified Information Security Manager (CISM), Certified Wound Specialist, Registered Professional Reporter, etc.), etc. Example subjective skills may include interpersonal skills (e.g., empathy, emotional intelligence, diplomatic, etc.). In some examples, the employment website includes standardized lists of skill for the users to select from to facilitate searching of job postings and candidate profiles. Alternatively or additionally, in some examples, the employment website extracts the skills from the user's submitted resumes. An Employment Website Entity (EWE) that operates the employment website adds supplemental data and metadata to the profile with or without the user being aware. The supplemental data includes additional information about jobs and/or education included in the user's profiles, such as job industry for each employer, company size for each employer, company health for each employer, tenure for each position, and/or accreditation for each educational institution, etc. The metadata includes information about events and interactions between the user and the employment website, such as number and dates of job searches, number and dates of viewing job postings, number and dates of starting applications for job postings, number and dates for finishing applications for job postings, dates that resumes are created, dates when the resume is updated, dates of logging into the employment website, dates of opening email from the employment website, and/or dates of clicking a link within emails from the employment website, etc.

As disclosed below, the employment website entity estimates scores to facilitate identifying the profiles in the profile database that are likely to respond to a communication regarding an opportunity and are likely to leave their current employment. The employment website entity periodically estimates a likelihood-to-respond (LTR) score for the profiles in the profile database. The LTR score represents a likelihood that the user associated with a particular profile will respond to a communication (e.g., an e-mail, a message via the employment website, etc.) from a recruiter or employer regarding an opportunity. The LTR analysis is based on the job-seeking activity of the user as well has the history of the user responding to similar opportunities (e.g., positions with similar skill requirements, positions within the same opportunity category, etc.). The LTR score is generated from time-to-time. For example, the employment website entity may calculate the LTR score hourly, daily, weekly, monthly, or quarterly. Additionally, in some examples, the employment website entity calculates the LTR score per job category. The LTR score(s) is/are stored with the profiles in the profile database.

In examples disclosed herein, when a search query is received that identifies one or more user profiles, the employment website entity automatically estimates a propensity-to-leave (PTL) score and an activity level for the user based on the identified user profile. The PTL score represents a likelihood that the user associated with the profile will leave their job. The activity level categorizes the job-seeking activity of the user associated with the corresponding user profile. To facilitate estimating the PTL score and the activity level on demand, the algorithms are computationally lightweight and stable. In some examples, the profiles that are responsive to the search query are filtered by thresholds accompanying the search query that specify a minimum LTR score, a minimum PTL score and/or a minimum activity level. The employment website entity provides at least a portion of the profile(s) along with the LTR score(s), the PTL score(s) and/or the activity level(s) as search results to the query.

In some examples disclosed herein, the employment website entity provides an application programming interface (API) to facilitate connection over a network between a recruiter's computer/employer's computer and a server that handles the search queries. As used herein, the "API" is a set of request messages with provider-defined structure that allow a remote user to access functionality of a server over a network (e.g., the Internet, an intranet, etc.). In such examples, the recruiter and/or employer uses the request messages to submit the search query to the server and receive the search results. Additionally or alternatively, the employment website entity provides website-based access to the server that handles the search query.

In examples disclosed herein, the employment website entity provides title-skill mapping for users of the employment website. The title-skill mapping estimates a difficulty to transit from one occupation to another and/or a difficulty to acquire a new skill based on existing skills of the user. When a user considers a job application or a recruiter and/or employer considers a candidate for an opportunity, the title-skill mapping provides insight into whether the user/candidate is likely able to perform and/or learn the skills for the opportunity.

FIG. 1 illustrates a system 100 to receive search queries 102 regarding candidates in a profile database 104 and estimate job and career transition capabilities of candidates in the profile database 104 in accordance with the teachings of this disclosure. In the illustrated example, the system 100 includes computing devices 106 (e.g., desktop computers, smartphones, tablets, etc.) that connect to an employment website entity 108 (e.g., www.CareerBuilder.com, etc.) via an external network 110. The computing devices 106 provide the search queries 102 to the employment website entity 108 and the employment website entity 108 replies with search results 112.

In the illustrated example, the computing devices 106 connect to the employment website entity 108 via an application programming interface (API) 114. To submit the search query 102, the computing devices 106 constructs a corresponding request message that includes search parameters and, in some examples, an API key that identifies the application and/or the employer/recruiter submitting the search query 102. The search parameters include unique identifiers (e.g., email addresses, serial numbers, account numbers, account aliases, names, etc.) associated with profiles 116 in the profile database 104, keywords (e.g., job titles, skills, occupations, locations, descriptors, etc.) that are used to identify profiles that the employer/recruiter may be interested in, and/or thresholds for the LTR score, the PTL score and/or the activity level, etc. Alternatively, computing devices 106 connect to the employment website entity 108 via a Uniform Resource Locator (URL) of a webpage provided by the employment website entity 108.

The external network 110 may be a public network, such as the Internet; a private network, such as an intranet; or combinations thereof, and may utilize a variety of networking protocols now available or later developed including, but not limited to, TCP/IP-based networking protocols.

The employment website entity 108 receives the search queries 102 from the computing devices 106. The employment website entity 108 processes the search queries and returned the search results 112 based on profiles in the profile database 104. In the illustrated example, the employment website entity 108 includes the profile database 104, a likelihood-to-respond (LTR) generator 118, a query handler 120, a query responder 122, a request responder 124 and a career path analyzer 126.

Figure 2:
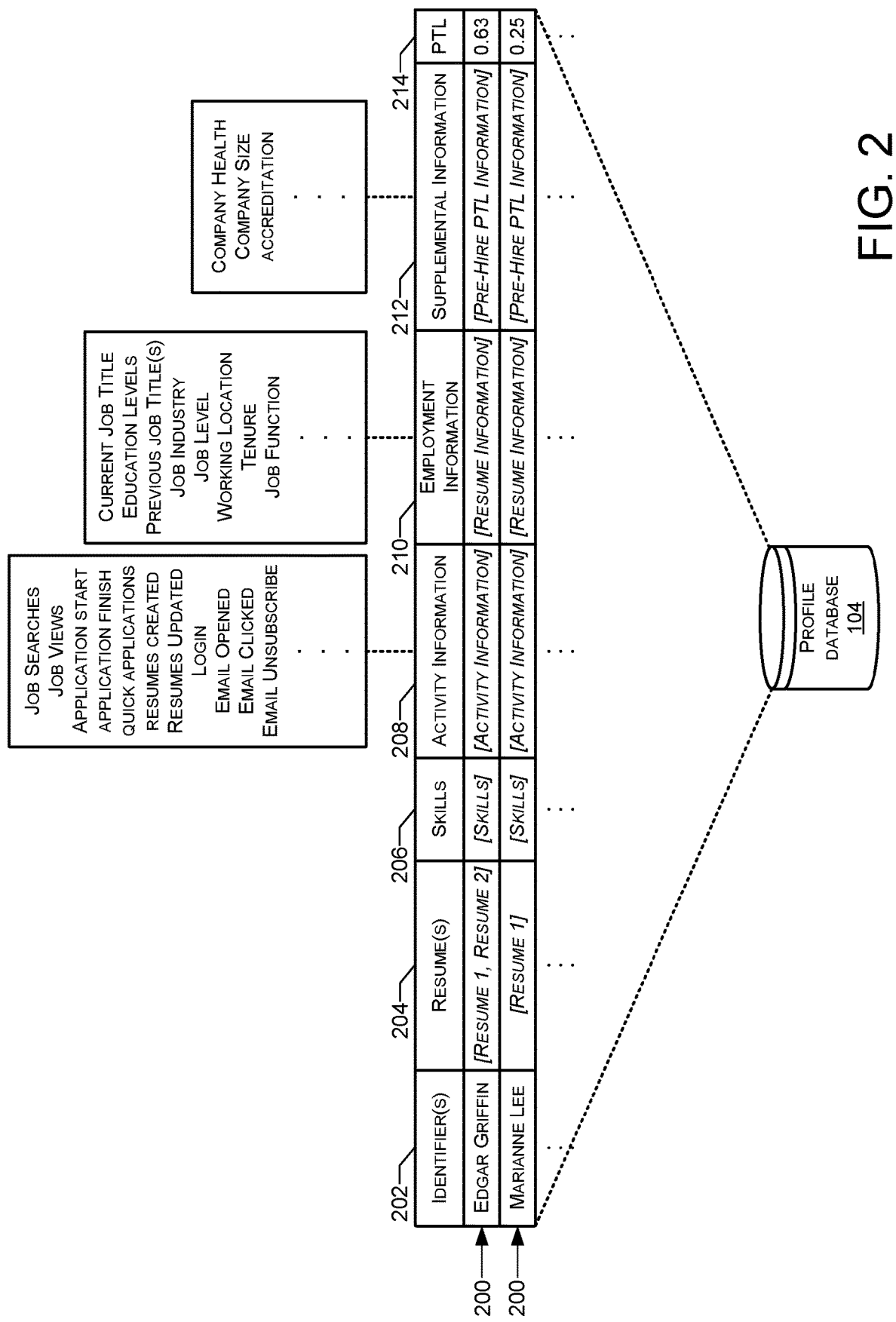
FIG. 2 is a diagram of example records in the profile database of FIG. 1.

The profile database 104 includes profiles of users registered with the employment website entity 108. When a user registers with the employment website entity 108, the user provides various identifying, demographic and resume information to the employment website entity 108. The employment website entity 108 then creates a profile 116 and inserts that profile into the profile database 104. FIG. 2 illustrates example profile records 200 in the profile database 104. In the illustrated example of FIG. 2, the profile records 200 includes an identifier field 202, a resume field 204, a skill field 206, an activity information field 208, a employment information field 210, a supplemental information field 212, and a PTL score field 214. The identifier field 202 includes one or more identifiers used to identify the user associated with profile. The identifiers may, for example, include a name, a serial number, an alias generated at registration, a telephone number, an email address, and/or a social media profile identifier, etc. Generally, in the search queries 102, the identifiers are used to identify specific profiles for users that the recruiter/employer already knows of. The resume field 204 includes resume(s) provided by the user associated with the profile record 200. The resume(s) may be structured (e.g., in a form decided by the employment website entity 108 with markup language tags, etc.) unstructured (e.g., uploaded in a form decided by the user in a DOC format or a PDF format, etc.). The skill field 206 includes skills of the user. In some examples, a process executing on a server analyzes the resume(s) of the user and selects skills are selected based on the analysis. Alternatively or additionally, in some examples, when generating the profile, the user selects skills from a list of skills provided by the employment website entity 108.

The activity information field 208 includes metadata regarding the corresponding user's use of the employment website. When the user interacts with the employment website, the employment website entity 108 autonomously updates the metadata in the profile record 200 based on the user interactions. For example, the metadata may include the dates that the user performs job searches, dates that the user views job listings, dates that the user starts an application, dates that the user finishes, dates that the user creates a resume, dates that the user updates a resume, dates that the user logged into the employment website, dates that the user opened an email from the employment website, dates that the user clicked on a link included in the email from the employment website, and/or dates that the user unsubscribed to the emails from the employment website, etc.

The employment information field 210 includes information derived from the resume(s). The employment information field 210 may include, for example, the user's current job title, the user's education level, the user's previous job titles, the industry of the user's current employer, the user's job level (e.g., entry level, junior level, senior level, management, etc.), the location of the user's current job, and/or the user's tenure at the current and prior employers, etc.

The supplemental information field 212 includes data regarding institutions (e.g., employers, schools, etc.) that are in the resume(s) submitted by the user. When a resume in submitted by a user, the employment website entity 108 retrieves (e.g., from internal and/or external databases, etc.) information about the institutions. For example, the supplemental information field 212 may include company health data (e.g., stock price, layoffs, turnover rate, lawsuits, etc.) company size, accreditation of school, etc.

The PTL score field 214 stores the PTL score(s) estimated by the PTL generator 134.

Returning to FIG. 1, the LTR generator 118 estimates the LTR score(s) 128 for the profiles 116 in the profile database 104. The LTR generator 118 generates the LTR score(s) 128 from time to time (e.g., hourly, daily, weekly, monthly, quarterly, etc.) automatically without input from an operator. To estimate the LTR score(s) 128, the LTR generator 118 (a) retrieves or otherwise receives one of the profile records 200, (b) calculates a LTR elapsed day (LTRE) score since the last successful communication, (c) calculates a LTR frequency score (LTRF), (d) averages the LTR elapsed day score and the LTR frequency score, and (e) normalize the average.

To calculate the LTR elapsed day score, the LTR generator 118 retrieves from the profile record 200 the date the user last submitted a resume or replied positively to the recruiter's communication (e.g. evidence that the candidate is interested in the opportunity). In some examples, the LTR generator 118 then determines a number of days (ND) since the user last submitted the resume or replied positively to the recruiter's communication (interested in the opportunity). In such examples, through a log transformation, the LTR generator 118 applies a truncation threshold (TT) on the number of days (ND). The truncation threshold (TT) limits the scope of the number of days (ND) that is considered for the LTR elapsed day score. For example, if the number of days (ND) since the user last submitted the resume is greater than the truncation threshold (TT), the LTR elapsed day score is zero. That is, under those circumstances, the user associated with the profile record 200 is unlikely to respond. To determine the LTR elapsed day score, the LTR generator 118 calculates a cumulative distribution function on the log transformation. In some examples, the LTR generator 118 calculates the LTR elapsed day score in accordance with Equation (1) below.

$$\text{LTRE} = 1 - e^{(-\lambda(\log(TT) - \log(ND)))} \qquad \text{Equation (1)}$$

In Equation (1) above, lambda ($\lambda$) is the inverse of the expected value of the log transformation. In some examples, the truncation threshold (TT) is 365 days. As a result, in such examples, the expected value may be 183 and lambda ($\lambda$) may be 0.0055. For example, if the user submitted a resume 91 days ago, the LTR elapsed day score is 0.0033.

To calculate the LTR frequency score, the LTR generator 118 performs a statistical analysis on the frequency that applications have been submitted by the users as represented by the profile records. When calculating the LTR frequency score for a particular profile record, the LTR generator 118 retrieves from the profile record 200 a number of applications the corresponding user has submitted. In some examples, the LTR generator 118 retrieves from the profile record 200 a number of applications (NA) the corresponding user has submitted in a defined period of time (e.g., the same period of time as the truncation threshold (TT)). Additionally, in some examples, the LTR generator 118 retrieves from the profile record 200 a number of applications (NA) the corresponding user has submitted in a particular category (sometimes referred an "industry") to calculate specific LTR frequency scores for the specific industries. For example, a user may have submitted 42 applications in total, where 31 of those applications were for jobs in the software development industry and 11 of those applications were for jobs in the food service industry.

Through a log transformation, the LTR generator 118 applies a frequency truncation (FT) to the number of applications (NA). In some examples, the frequency truncation (FT) is the number of applications corresponding to the 99th percentile determined during the statistical analysis. For example, the frequency truncation (FT) may be 63. To determine the LTR frequency score, the LTR generator 118 calculates a cumulative distribution function on the log transformation. In some examples, the LTR generator 118 calculates the LTR frequency score in accordance with Equation (2) below.

$$\text{LTRF} = e^{(-\lambda(\log(FT) - \log(NA)))} \qquad \text{Equation (2)}$$

In Equation (2) above, lambda ($\lambda$) is the inverse of the expected value of the log transformation. In some examples, when the frequency truncation (FT) is 63, the expected value may be 32 and lambda ($\lambda$) may be 0.0313. For example, if the user submitted 42 total applications, the overall LTR frequency score may be 0.9945. As another example, if the user submitted 31 applications in software development category and 11 applications for the food service category, the LTR frequency score for the software development category may be 0.9904, and the LTR frequency score for the food service category may be 0.9766.

After determining the LTR elapsed day score and the LTR frequency score, the LTR generator 118 averages the LTR elapsed day score and the LTR frequency score by computing the geometric mean of the two scores. In some examples, the LTR generator 118 averages the LTR elapsed day score and the LTR frequency score for each category. In some examples, the LTR generator 118 averages the LTR elapsed day score and the LTR frequency score in accordance with Equation (3) below.

$$\text{LTRA} = \sqrt{\text{LTRE} \times \text{LTRF}} \qquad \text{Equation (3)}$$

In Equation (3) above, LTRA is the average of the LTR elapsed day score and the LTR frequency score. For example, if the LTR elapsed day score is 0.0033 and the LTR frequency score 0.9945, the average may be 0.0573. As another example, if the LTR elapsed day score is 0.0033, the LTR frequency score for the software development category is 0.9904 and the LTR frequency score for the food service category is 0.9766, the average for the software development category may be 0.0572, and the average for the food service category may be 0.0568.

After the averages of the LTR elapsed day score and the LTR frequency score are calculated for the profile records 200 in the profile database 104, the LTR generator 118 normalizes the averages to estimate the LTR scores 128. To normalize the averages, the LTR generator 118 determines the value of the highest average and the value of the lowest average amongst all the calculated averages. In some examples, the averages are normalized in accordance with Equation (4) below.

$$LTR\ \text{Score} = \frac{LTRA - \min}{\max - \min} \qquad \text{Equation (4)}$$

In Equation (4) above, min is the lowest average amongst all the calculated averages and max is the highest average amongst all the calculated averages. For example, if the particular average for the software development category was 0.0572, the min is 0.0020 and the max is 0.0740, the LTR score 128 for the software development category may be 0.7667. In other words, in such an example, the user associated with the profile record 200 may have a 76.67% of responding to a communication regarding an opportunity related to the software development industry.

The query handler 120 receives the search queries 102 from the computing devices 106. In some examples, the query handler 120 receives the search queries 102 via the API 114. The query handler 120 parses the search queries 102 to generate a database query 130. The database query 130 is generated to cause profile records 200 from the profile database 104 to be identified that are relevant to the search query 102. For example, if the search query 102 includes an identifier, then the database query 130 is structured to retrieve the profile record 200 associated with that identifier.

In the illustrated example, the query handler 120 sends the relevant profile records 200 to the query responder 122. The query responder 122 then automatically generates real-time scores 132 and sends the real-time scores 132 to the query handler 120. The real-time scores 132 include the PTL score and the activity level. In the illustrated example, the query responder 122 includes a PTL generator 134 and an activity level (AL) generator 136.

From time-to-time, the PTL generator 134 generates a model to estimate the PTL scores. To generate the model, the PTL generator 134 uses the activity information, the employment information, and/or the supplement information from the profile records 200 in the profile database 104. Additionally, the PTL generator 134 derives hybrid data such as elapsed time since the last activity on the employment website by the user, job search count, application submitted count, resume modification count, number of active days in a given period of time (e.g., 7 days, 30 days, 90 days, 180 days, etc.), an aggregate number of job changes, and/or tenure in each position, etc. for the profile records 200. The PTL generator 134 uses supervised machine learning techniques to generate a predictor. When information from a particular profile record 200 is applied to the predictor, the PTL generator 134 produced the estimated PTL score. In some examples, to reduce the influence of negative effects (e.g., signals of a low likelihood to transition jobs) in the predictor, the PTL generator 134 excludes profile records 200 from the training set(s) that have no profile changes, have less than one year of tenure at any position, and/or a total tenure across all jobs greater than 30 years. Additionally, in some examples, the PTL generator 134 excludes profile records 200 from the training set(s) that indicates that the corresponding user has not completed a minimum level of activity (e.g., has logged in at least once, created at least one resume, or search for at least one job within the last six months, etc.). In some examples, the PTL generator 134 uses logistic regression and bagged decision trees to create the predictor. Alternatively, in some examples, the PTL generator 134 uses log-transformed exponential distribution to create the predictor. The machine learning techniques are selected so that the predictor is light weight and stable so that the predictor can be used to generate the PTL scores on demand.

The PTL generator 134 estimates the PTL score. The PTL score is a probabilistic measurement of a likelihood that the user associated with the profile record 200 will leave their current job. The PTL generator 134 retrieves the activity information, the supplemental information, and/or the pre-hire PTL information from the profile record 200. From the activity information, the employment information, and/or supplement information, the PTL generator 134 derives the hybrid data for the particular profile record 200. If the profile record 200 indicates that the user has not completed a minimum level of activity (e.g., has only logged in once, created the only resume with the last week, and/or only applied for one job, etc.), the PTL generator 134 returns a value indicative of not enough information to generate the PTL score (e.g., zero). The PTL generator 134 applies the predictor to the activity information, the supplemental information, the pre-hire PTL information, and/or the hybrid data to generate the probabilistic measurement of the likelihood that the user associated with the profile record 200 will leave their current job.

The AL generator 136 categorizes an activity level of the user associated with the profile record 200 based on a percentile level determined by the activity data in the profile record 200. The percentile levels are segregated into different activity levels. For example, percentile levels below 50 percent may be a first activity level (sometimes referred to as "passive" or "non-active"), percentile levels between 50th percentile to 75th percentile may be a second activity level (sometimes referred to as "less active"), percentile levels between 75th percentile and 90th percentile may be a third activity level (sometimes referred to as "active"), percentile levels between 90th percentile and 99.9th percentile may be a fourth activity level (sometimes referred to as "very active"), and percentile levels above 99.9th percentile may be a fifth activity level (sometimes referred to as "super active").

The query handler 120 receives or otherwise retrieves the real-time scores 132 from the query responder 122. In some examples, the search query 102 includes one or more employer/recruiter definable thresholds to limit responses included in the search results 112. The thresholds include a LTR threshold that filters profile records 200 based on the associated LTR score 128, a PTL threshold that filters profile records 200 based on the associated PTL score, and/or an activity threshold that filters the profile records 200 by the AL score. For example, if the search query 102 includes a LTR threshold of 60 percent, the search results 112 do not include information from profile records 200 retrieved by the database query 130 that have the LTR score(s) less than 60 percent. The query handler 120 generates the search results 112 to include information from the profile records 200 retrieved by the database query 130 that satisfy any threshold(s) included in the search query 102. For each of the profile record(s) 200 that are retrieved by the database query 130 and satisfy the threshold(s), the search results 112 include (a) at least a portion of the profile record 200 (e.g., the resume(s) and/or the skill(s), etc.) and (b) the LTR scores 128 and the real-time scores 132.

In some examples, the search query 102 includes a request to track one or more profile records 200. The request includes one or more of the employer/recruiter definable thresholds as discussed above. In such examples, the query handler 120 sends a list of identifiers 138 to the request responder 124. The request responder 124, from time-to-time (e.g., hourly, daily, weekly, monthly, etc.), via the query handler 120, causes profile records 200 associated with the identifiers on the list of identifiers to be retrieved and the real-time scores 132 to be estimate for those profile records 200. When the real-time scores 132 and/or the LTR score of one of the profile records 200 satisfy (e.g., are greater than or equal to) the threshold(s) included in the request, the query handler 120 sends the search results 112 to the computing device 106 with (a) at least a portion of the profile record 200 (e.g., the resume(s) and/or the skill(s), etc.) and (b) the LTR scores 128 and the real-time scores 132. In such a manner, the employer/recruiter can monitor users they are interested in an act when the users are more likely to response to a communication and/or are more likely to leave their current employment.

In some examples, a user sends a career path query 140 to the employment website entity 108. The career path query 140 requests a career path analysis that estimates (a) a difficulty to move from one job title to another job title and/or (b) a difficulty acquiring a skill based on the current skills of the user. The career path analyzer 126 receives or otherwise retrieves the career path query 140 and forms a database query 130 to retrieve the profile record 200 associated with the career path query 140. With the information in the profile record 200, the career path analyzer 126, using a model, determines a difficulty in the user transitioning to a job title identified in the career path query 140 and/or acquiring a skill identified in the career path query 140. Skill title mapping links skills to job titles, which may interconnect job titles via various different skills. Using the skill-title mapping, the career path analyzer 126 uses a random walk-based graph model to measure the difficulty. Additionally, in some examples, the career path analyzer 126 suggests a career path from the user's current job title to the desired job title and/or identifies target skills to acquire in order to facilitate the change in job titles. The career path analyzer 126 generates a career path response 142 and sends, via the query handler 120, the career path response to the computing device 106 that originated the career path query 140. In some examples, the career path analyzer 126 generates a capabilities score that measures the likelihood that the candidate associated with a profile 116 is capable of performing the responsibilities of a particular opportunity and/or the responsibilities of opportunities in a category. The career path analyzer 126 generates capabilities score by analyzing the skills identified in the profile 116 and skills of the opportunity and/or the category.

Figure 3:
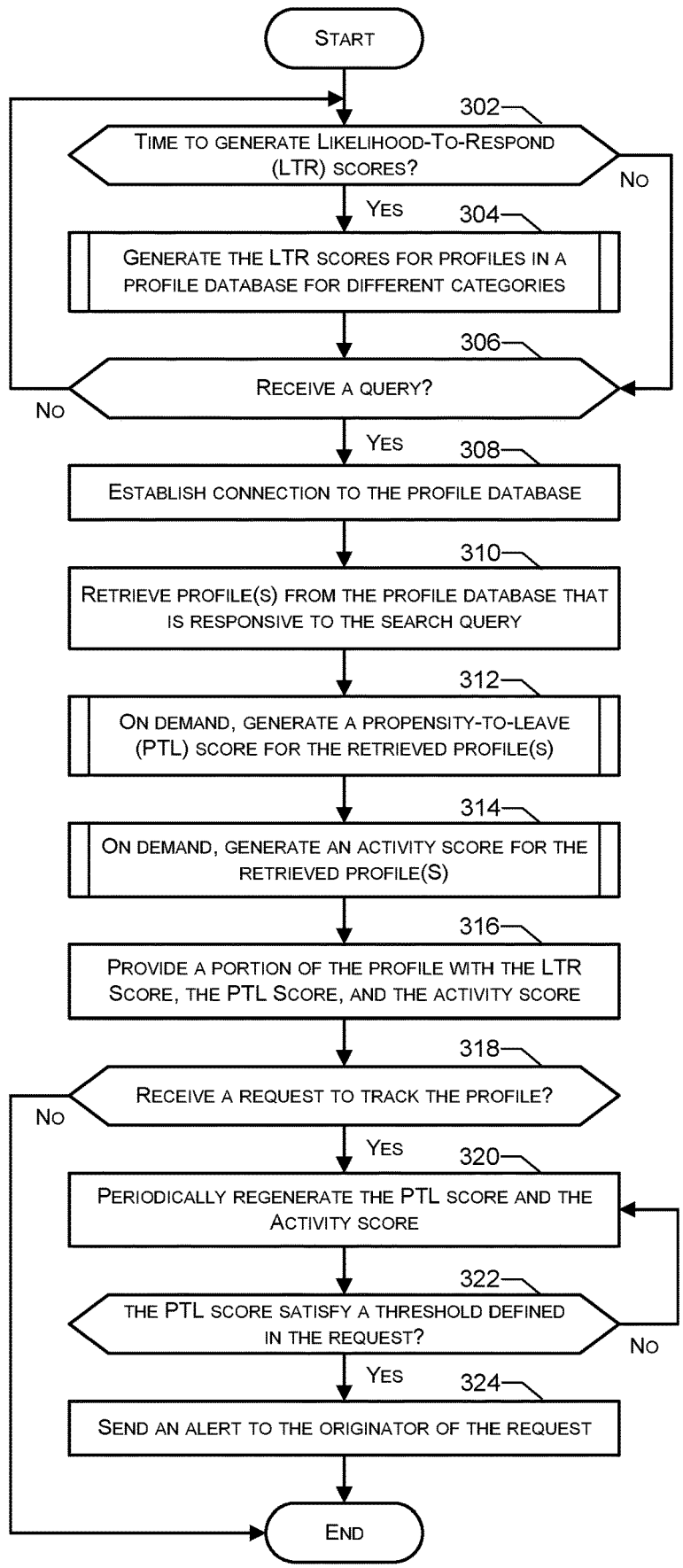
FIG. 3 is a flowchart of a method to estimate job and career transition capabilities of candidates in the profile database, which may be implemented by the server of FIG. 7.

FIG. 3 is a flowchart of an example method to estimate job and career transition capabilities of candidates in the profile database 105, which may be implemented by the server 700 of FIG. 7 below. Initially, the LTR generator 118 waits until it is time to generate the LTR scores for the profile records 200 in the profile database 104 (block 302). For example, the LTR generator 118 may generate the LTR scores every three months. When it is time to generate the LTR scores, the LTR generator 118 generates the LTR scores for the profile records 200 in the profile database 104 for different categories (block 304). An example of generating the LTR scores for the profile records 200 in the profile database 104 for different categories is describe in connection with FIG. 4 below.

The query handler 120 waits until a search query 102 is received from a computing device 106 (block 306). The query handler 120 establishes a connection to the profile database 104 (block 308). The query handler 120 retrieves one or more profile records 200 responsive to the search query 102 from the profile database (block 310). As a result of receiving the search query 102, the query responder 122, without further input from an operator, generates the PTL score(s) for the retrieved profile record(s) 200 (block 312). An example method of generating the PTL score(s) for the retrieved profile record(s) 200 is described in connection with FIG. 5 below. The query responder 122, without further input from an operator, generates an activity level (AL) score for the retrieved profile record(s) 200 (block 314). An example method of generating the AL score for the retrieved profile record(s) 200 is described in connection with FIG. 6 below. The query handler 120 sends a search result 112 to the computing device 106 that originated the search query 102 with (a) a portion of the profile record(s) 200, and (b) the corresponding LTR score(s), PTL score(s), and the AL score(s) (block 316).

The query handler 120 determines whether it has received a search query 102 to with a request to track one or more users associated with profile record(s) 200 in the profile database 104 (block 318). When the query handler 120 has received such a request, the request responder 124 causes the query responder 122 to regenerate the PTL score and the AL score (block 320). The request responder 124 waits until the PTL score satisfies a threshold defined in the search query 102 (block 322). When the PTL score satisfies the threshold defined in the search query 102, the request responder 124, via the query handler 120, sends an alert to the computing device 106 that originated the search query 102 (block 324).

Figure 4:
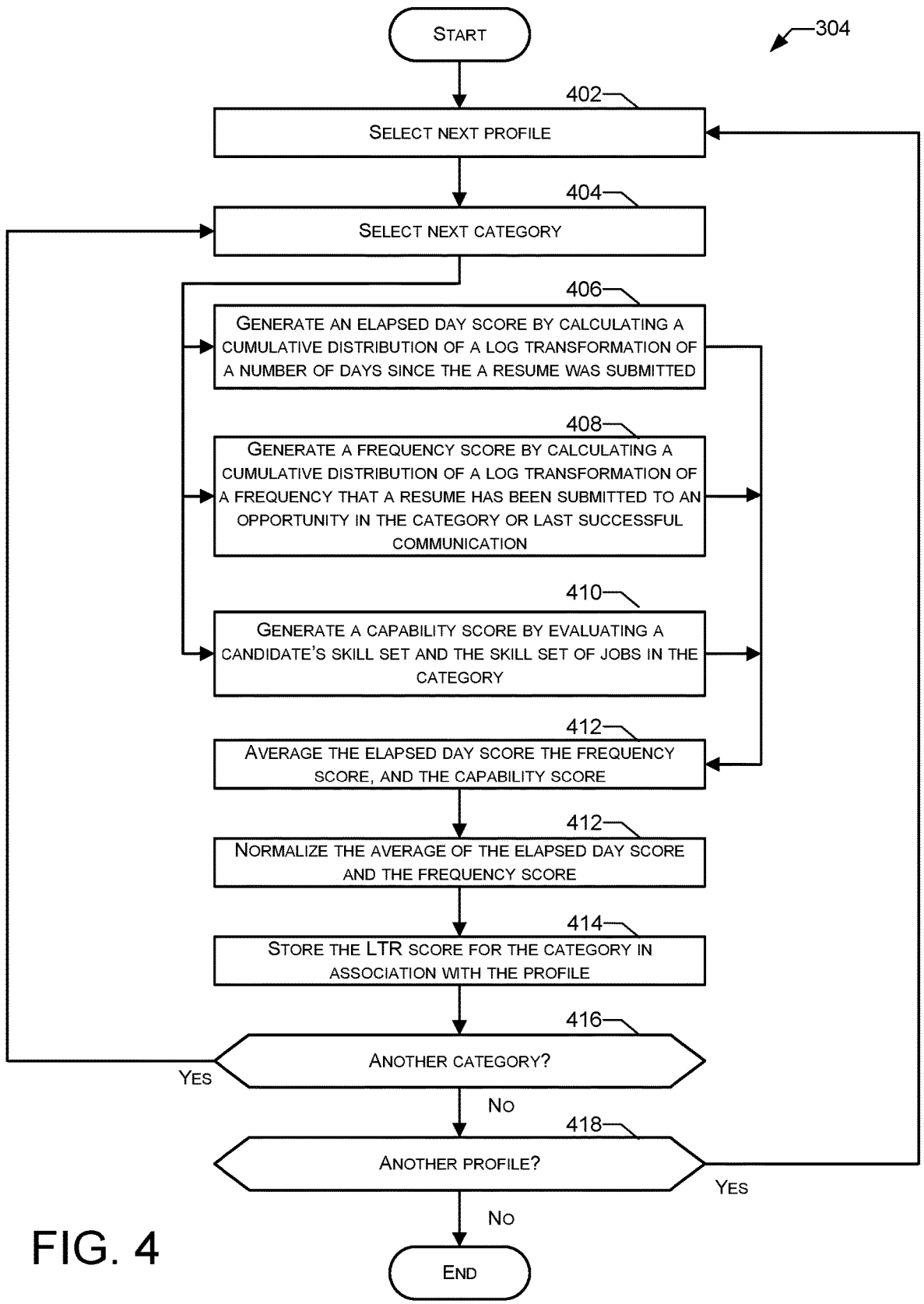
FIG. 4 is a flowchart of a method to estimates a likelihood that a candidate with a profile in the profile database will respond to a recruiter, which may be implemented by the server of FIG. 7.

FIG. 4 is a flowchart of a method to estimate a likelihood that a candidate with a profile record 200 in the profile database 104 will respond to a recruiter, which may be implemented by the server 700 of FIG. 7 below. Initially, the LTR generator 118 selects the next profile record 200 in the profile database 104 (block 402). The LTR generator 118 then selects the next category for which to generate the LTR score 128 (block 404). The LTR generator 118 generates an elapsed day score by calculating a cumulative distribution of a log transformation of a number of days since a resume was last submitted by the user (block 406). The LTR generator 118 generates a frequency score by calculating a cumulative distribution of a log transformation of a frequency that resumes have been submitted to an opportunity in the selected category (block 408). In some examples, the LTR generator 118 receives a capability score generated by the career path analyzer 126. (block 410). The capability score measures the likelihood that the candidate associated with the profile is capable of performing the responsibilities of the opportunity. The LTR generator 118 averages the elapsed day score and the frequency score (block 414). In some examples, the LTR generator 118 also includes the capability score in the average. The LTR generator 118 normalizes the average of the elapsed day score and the frequency score to generate the LTR score 128 (block 414). When there is another category, the LTR generator 118 returns to block 404 to select the next category (block 412). When there is not another category and when there is another profile record 200 in the profile database 104 for which to generate the LTR score, the LTR generator 118 returns to block 402 to select the next profile record 200 (block 416).

Figure 5:
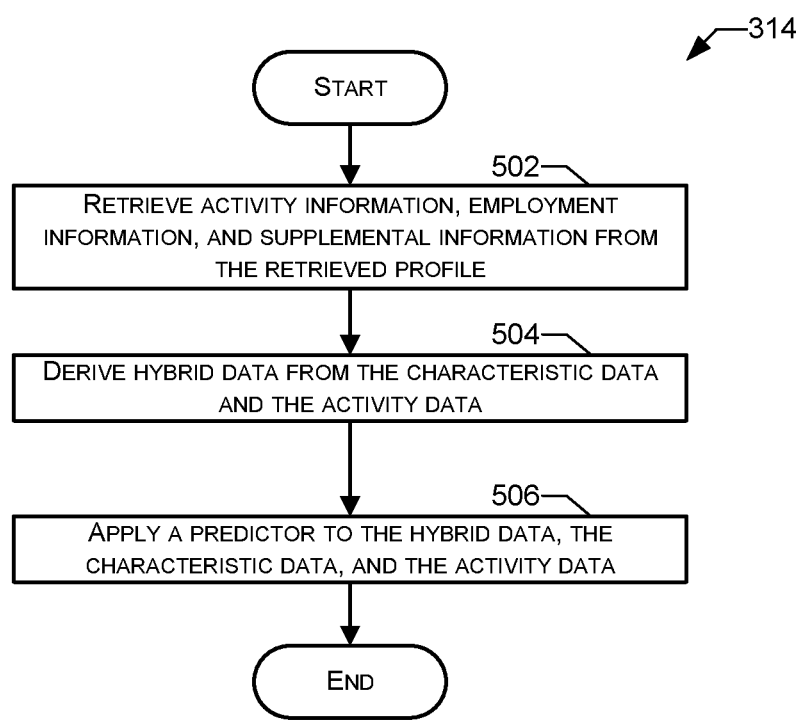
FIG. 5 is a flowchart of a method to estimate a likelihood that a candidate with a profile in the profile database will leave their job, which may be implemented by the server of FIG. 7.

FIG. 5 is a flowchart of a method to estimate a likelihood that a candidate with a profile record 200 in the profile database 104 will leave their job, which may be implemented by the server 700 of FIG. 7 below. Initially, the PTL generator 134 retrieves the activity information and the supplemental information from the retrieved profile record 200 (block 502). The PTL generator 134 then derives "hybrid data" from the activity information and the supplemental information (block 504). The hybrid data is information that is derived from the information stored in the profile record 200, but is not necessarily itself stored in the profile record. For example, the activity information may include dates that the user submitted applications and the derived hybrid data may be a number of applications submitted by the user in the past three months. The PTL generator 134 applies a predictor to the activity information, the supplemental information, and the hybrid data to generate the PTL score (block 506).

Figure 6:
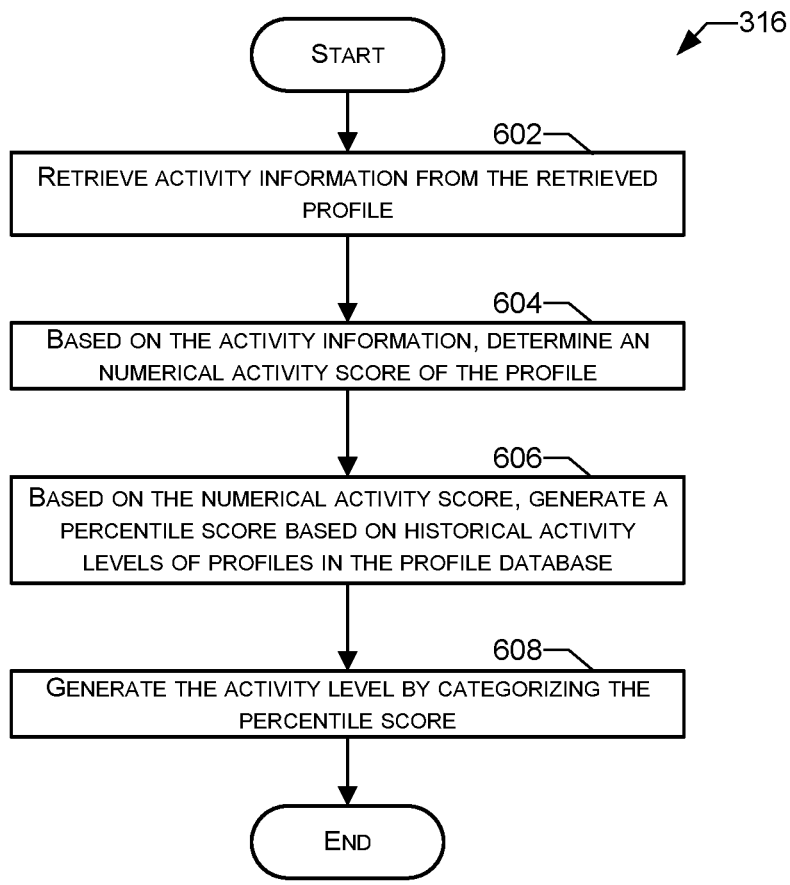
FIG. 6 is a flowchart of a method to categorize an activity level of a candidate in a profile in the profile database, which may be implemented by the server of FIG. 7.

FIG. 6 is a flowchart of a method to categorize an activity level of a candidate in a profile record 200 in the profile database 104, which may be implemented by the server 700 of FIG. 7 below. Initially, the AL generator 136 retrieves activity information from the retrieved profile record 200 (block 602). The AL generator 136, based on the activity information, computes a numerical activity score of the user associated with the profile record 200 (block 604). The AL generator 136, based on the numerical activity score generates a percentile activity score based of the profile records 200 (block 606). The AL generator 136 generates the categorical activity level by categorizing the percentile score (block 608).

The flowcharts of FIGS. 3, 4, 5, and 6 are representative of machine readable instructions stored in memory (such as the memory 704 of FIG. 7 below) that comprise one or more programs that, when executed by a processor (such as the processor 702 of FIG. 2 below), cause the employment website entity 108 to implement the example LTR generator 118, the example query handler 120, the example query responder 122, and/or the example request responder 124 of FIG. 1. Further, although the example program(s) is/are described with reference to the flowcharts illustrated in FIGS. 3, 4, 5, and 6, many other methods of implementing the example LTR generator 118, the example query handler 120, the example query responder 122, and/or the example request responder 124 may alternatively be used. For example, the order of execution of the blocks may be changed, and/or some of the blocks described may be changed, eliminated, or combined.

Figure 7:
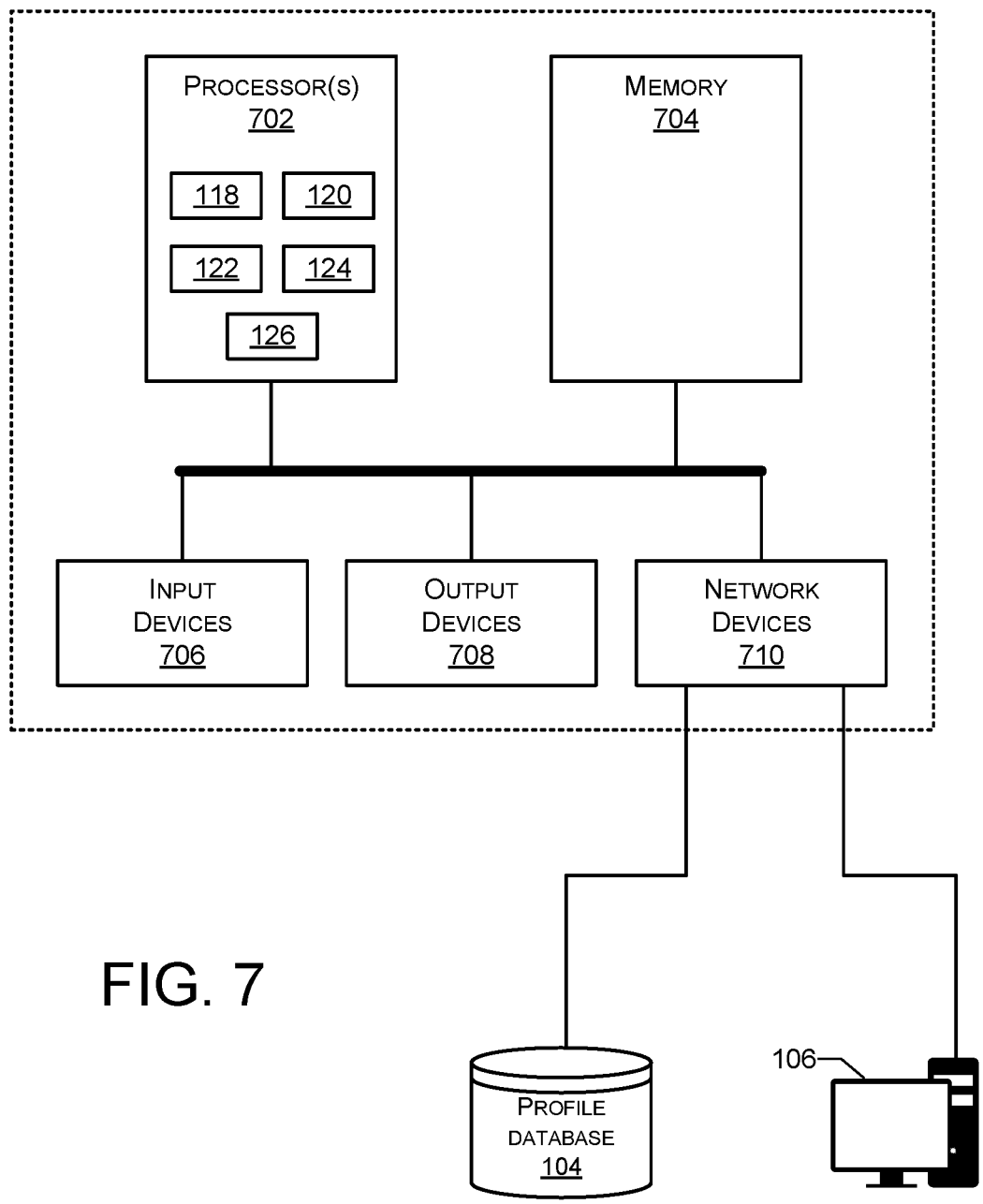
FIG. 7 is a block diagram of a server.

FIG. 7 is a block diagram of a server 700 of the employment website entity 108. As illustrated in FIG. 7, the server 700 includes a controller or processor 702. Further, the server 700 includes memory 704, input device(s) 706, output device(s) 708, and network device(s) 710.

In the illustrated example, the processor 702 is structured to include the LTR generator 118, query handler 120, the query responder 122, the request responder 124, and the career path analyzer 126. The processor 702 of the illustrated example may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). In some examples, the memory 704 is volatile memory (e.g., RAM including non-volatile RAM, magnetic RAM, ferroelectric RAM, etc.), non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). Further, in some examples, the memory 704 includes multiple kinds of memory, particularly volatile memory and non-volatile memory.

The memory 704 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 704, the computer readable medium, and/or within the processor 702 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the input device(s) 706 enable a user, such as an information technician of the employment website entity 108, to provide instructions, commands, and/or data to the processor 702. Examples of the input device(s) 706 include one or more of a button, a control knob, an instrument panel, a touch screen, a touchpad, a keyboard, a mouse, a speech recognition system, etc.

The output device(s) 708 of the illustrated example display output information and/or data of the processor 702 to a user, such as an information technician of the employment website entity 108. Examples of the output device(s) 708 include a liquid crystal display (LCD), an organic light emitting diode (OLED) display, a flat panel display, a solid state display, and/or any other device that visually presents information to a user. Additionally or alternatively, the output device(s) 708 may include one or more speakers and/or any other device(s) that provide audio signals for a user. Further, the output device(s) 708 may provide other types of output information, such as haptic signals.

The example network devices 710 include any suitable communication device that facilitates communication with the computing devices 106 over the external network 110. In the illustrated example, the profile database 104 may be local (e.g., within the same server blade or server farm) or may be remote (e.g., separated by a physical distance and connected via a network).

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for processing a search query indicative of a candidate to hire, the system comprising:
    a database including records of a plurality of profiles;
    a network connector to provide access to the database via an application programming interface; and
    a computing device configured to:
        in response to receiving a search query via the network connector:
            establish a connection to the database;
            retrieve one of the plurality of profiles responsive to the search query from the database;
            generate, on demand, a first score based on characteristic data and activity data in the retrieved profile, the first score being a probabilistic measurement of a likelihood that a person associated with the retrieved profile will change jobs; and
            present, via the network connector, at least a portion of the profile with the first score; and
        in response to receiving a request, via the application programming interface, to track the profile associated with the search query, the request including a threshold:
            periodically automatically regenerate the first score based on the characteristic data and the activity data in the profile;
            when the first score satisfies the threshold, send an alert to an originator of the search query; and
        periodically generate a second score according to a pre-set time schedule for each of a plurality of categories for the plurality of profiles in the database, each of the second scores representing a likelihood that the person associated with the respective profile will respond to a communication regarding a job in a respective one of plurality of categories, wherein to generate the second score for each of the plurality of categories for the plurality of profiles in the database, the computing device is to:

calculate a third score, the third score based on a cumulative distribution of a log transformation of a number of days since the person has submitted a resume as indicated by the respective profile;

for each category, calculate a fourth score, the fourth score based on a cumulative distribution of a log transformation of a frequency that the person has submitted the resume for a job in the respective category as indicated by the respective profile; and for each category, generate the second score by (i) averaging the third score and the fourth score and (ii) normalizing a result of averaging the third score and the fourth score.

2. The system of claim 1, wherein the computing device is to present, via the network connector, the portion of the profile with the first score and the second score.

3. The system of claim 1, wherein to average the third score and the fourth score, the computing device is to generate a geometric mean of the third score and the fourth score.

4. The system of claim 1, wherein to generate the first score, the computing device is to:
retrieve the characteristic data and the activity data from the retrieved profile;
derive hybrid data from the characteristic data and the activity data; and
apply a predictor to the characteristic data, the activity data, and the hybrid data.

5. The system of claim 1, wherein the computing device is to generate, on demand, a fifth score based on the activity data in the retrieved profile, the fifth score is representative of a percentile level of activity associated with searching for a new job.

6. The system of claim 5, wherein to generate the fifth score, the computing device is to categorize the activity data based on the activity data of other profiles in the database.

7. The system of claim 5, wherein in response to receiving the request, via the application programming interface, to track the profile associated with the search query, the computing device is to periodically automatically regenerate the fifth score based on the activity data in the retrieved profile, wherein the alert includes the first score and the fifth score.

8. The system of claim 5, wherein the computing device is to present, via the network connector, the portion of the profile with the first score and the fifth score.

9. A method to process a search query for a candidate to hire, the method comprising:
in response to receiving the search query via an application programming interface:
establishing a connection to the database;
retrieving one of the profiles responsive to the search query from the database;
generating a first score based on characteristic data and activity data in the retrieved profile, the first score being a probabilistic measurement of a likelihood that a person associated with the retrieved profile will change jobs; and
presenting, via the application programming interface, a portion of the profile with the first score;
in response to receiving a request, via the application programming interface, to track the profile associated with the search query, the request including a threshold:
periodically automatically regenerating the first score based on the characteristic data and the activity data in the profile; and
when the first score satisfies the threshold, sending an alert to an originator of the search query; and periodically generating a second score according to a pre-set time schedule for each of a plurality of categories for the plurality of profiles in the database, each of the second scores representing a likelihood that a person associated with the respective profile will respond to a communication regarding a job in a respective one of plurality of categories, wherein generating the second score for each of the plurality of categories for the plurality of profiles in the database comprises:
calculating a third score based on a cumulative distribution of a log transformation of a number of days since the person has submitted a resume as indicated by the respective profile;
for each category, calculating a fourth score based on a cumulative distribution of a log transformation of a frequency that the person has submitted the resume for a job in the respective category as indicated by the respective profile; and
for each category, generating the second score by (i) generating a geometric mean of the fourth score and the fifth score and (ii) normalizing a result of averaging the fourth score and the fifth score.

10. The method of claim 9, wherein presenting the portion of the profile with the first score comprises also presenting the second score.

11. The method of claim 9, comprising generating, on demand, a fifth score by categorizing the activity data in the retrieved profile based on the activity data of other profiles in the database, the fifth score is representative of a percentile level of activity associated with searching for a new job.

12. The method of claim 11, comprising, in response to receiving the request, via the application programming interface, to track the profile associated with the search query, periodically automatically regenerating the fifth score based on the activity data in the retrieved profile, wherein the alert includes the first score and the fifth score.

13. The system of claim 12, wherein presenting the portion of the profile with the first score comprises also presenting the fifth score.

14. A system for processing a search query indicative of a candidate to hire, the system comprising:
a database including records of a plurality of profiles;
a computing device configured to:
in response to receiving a search query via an application programming interface:
establish a connection to the database;
retrieve one of the plurality of profiles responsive to the search query from the database;
generate, on demand, a first score based on characteristic data and activity data in the retrieved profile, the first score being a probabilistic measurement of a likelihood that s person associated with the retrieved profile will change jobs; and
present, via the application programming interface, at least a portion of the profile with the first score; and
in response to receiving, via the application programming interface, a request, including a threshold, to track the profile associated with the search query:
periodically automatically regenerate the first score based on the characteristic data and the activity data in the profile;
when the first score satisfies the threshold, send an alert to an originator of the search query; and
periodically generate a second score according to a pre-set time schedule for each of a plurality of categories for the plurality of profiles in the database, each of the second scores representing a likelihood that the person associated with the respective profile will respond to a communication regarding a job in a respective one of plurality of categories, wherein to generate the second score for each of the plurality of categories for the plurality of profiles in the database, the computing device is to:

calculate a third score based on a cumulative distribution of a log transformation of a number of days since the person has submitted a resume as indicated by the respective profile;

for each category, calculate a fourth score based on a cumulative distribution of a log transformation of a frequency that the person has submitted the resume for a job in the respective category as indicated by the respective profile; and for each category, generate the second score by averaging the third score and the fourth score and normalizing a result of the averaging.

* * * * *